United States Patent
Ni (10) Patent No.: US 8,325,716 B2
(45) Date of Patent: Dec. 4, 2012

(54) DATA PATH OPTIMIZATION ALGORITHM

(75) Inventor: Shih-Hsiung Ni, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 2218 days.

(21) Appl. No.: 09/982,794

(22) Filed: Oct. 22, 2001

(65) Prior Publication Data

US 2003/0076832 A1    Apr. 24, 2003

(51) Int. Cl.
    *H04L 12/28* (2006.01)
(52) U.S. Cl. .................. 370/389; 709/220; 709/246
(58) Field of Classification Search .............. 370/389; 709/236, 246, 220, 249
    See application file for complete search history.

(56) References Cited

U.S. PATENT DOCUMENTS

| | | | | |
|---|---|---|---|---|
| 4,590,467 A | * | 5/1986 | Lare | 370/462 |
| 4,613,954 A | * | 9/1986 | Sheth | 710/57 |
| 5,101,404 A | * | 3/1992 | Kunimoto et al. | 370/398 |
| 5,249,178 A | * | 9/1993 | Kurano et al. | 370/392 |
| 5,390,173 A | | 2/1995 | Spinney et al. | 370/60 |
| 5,430,842 A | * | 7/1995 | Thompson et al. | 709/236 |
| 5,491,802 A | * | 2/1996 | Thompson et al. | 709/236 |
| 5,566,170 A | * | 10/1996 | Bakke et al. | 370/392 |
| 5,781,549 A | | 7/1998 | Dai | 370/398 |
| 5,802,064 A | * | 9/1998 | Lieberman | 370/469 |
| 5,825,765 A | * | 10/1998 | Menzilcioglu et al. | 370/395.71 |
| 5,974,466 A | * | 10/1999 | Mizutani et al. | 709/236 |
| 6,104,696 A | | 8/2000 | Kadambi et al. | 370/218 |
| 6,122,279 A | * | 9/2000 | Milway et al. | 370/395.32 |
| 6,198,746 B1 | * | 3/2001 | Saito | 370/398 |
| 6,356,951 B1 | * | 3/2002 | Gentry, Jr. | 709/250 |
| 6,389,468 B1 | * | 5/2002 | Muller et al. | 709/226 |
| 6,449,656 B1 | * | 9/2002 | Elzur et al. | 709/236 |
| 6,512,773 B1 | * | 1/2003 | Scott | 370/395.61 |
| 6,567,413 B1 | * | 5/2003 | Denton et al. | 370/401 |
| 6,697,873 B1 | * | 2/2004 | Yik et al. | 709/238 |
| 6,789,144 B1 | * | 9/2004 | Lai et al. | 710/57 |
| 7,139,271 B1 | * | 11/2006 | Parruck et al. | 370/392 |
| 7,286,566 B1 | * | 10/2007 | Parruck et al. | 370/474 |

FOREIGN PATENT DOCUMENTS

| | | |
|---|---|---|
| EP | 0 572 145 A3 | 12/1993 |
| EP | 0572145 A2 * | 12/1993 |
| EP | 0572145 A3 * | 12/1993 |
| WO | WO 01/47168 | 6/2001 |

\* cited by examiner

*Primary Examiner* — Kamal Divecha (57) ABSTRACT

The present invention is drawn to a network device configured to prevent data misalignment of a data packet containing extra header bytes. The network device includes an ingress module having an input interface to receive data. A header detector configured to detect the header bytes of the cell and remove the header from the cell of the data packet is also provided on the network device. A counter determines whether the cell of the data packet contains a multiple of a predetermined bytes. If the counter determines that the cell of the data packet does not satisfy the multiple of the predetermined bytes, an insertion module inserts null bytes into the cell of the data packet to form a modified cell of the data packet. Then, an extraction module removes the null bytes from the modified cell of the data packet when the modified cell exits the network device.

13 Claims, 7 Drawing Sheets

MAC HEADER WORD 1

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| E | E_Status | | IP_Type | | | | L3_Type | | | | L3_TOS_Diff | | | | | | | MPLS | L2_V | L2_Priority | | | L2_Type | | | INGRESS PORT (CHANNEL) ID | | | | | |

| Bit | NAME | DESCRIPTION |
|---|---|---|
| 31 | ERROR | 0: FRAME CONTAINS NO MAC-DETECTABLE ERROR<br>1: FRAME CONTAINS ERROR - SEE E_STATUS FOR DETAIL |
| 30~29 | E_STATUS | 00: RESERVED<br>10: L3 HEADER CHECKSUM ERROR<br>11: L3 IP HEADER TTL<=1 |

| Bits | Field | Description |
|---|---|---|
| 28~26 | IP_TYPE | IP(LAYER 4) PROTOCOL TYPE<br>000: TCP<br>001: UDP<br>010: ICMP<br>011: IGMP<br>100~110: RESERVED<br>111: OTHER - NOT RECOGNIZED |
| 25~22 | L3_TYPE | LAYER 3 FRAME TYPE - PLEASE NOTE THAT FOR BIT 25= (IP TYPE) BIT<br>23 SIGNIFIES OPTION FIELD USE, AND BIT 22, FRAGMENTATION.<br>0000: IPv4 - NOT FRAGMENTED AND NO OPTION FIELD IN USE<br>0001: IPv4 - FRAGMENTED AND NO OPTION FIELD IN USE<br>0010: IPv4 - OPTION FIELD IN USE<br>0011: IPv4 - FRAGMENTED AND OPTION FIELD IN USE<br>0100~1110: RESERVED<br>1111: OTHER - NOT RECOGNIZED |
| 21~16 | L3_TOS_DIFF | VALUE OF IP TOS/DIFFSERV FIELD CONTENT. |
| 15 | MPLS STATUS | MPLS LABEL STATUS<br>0: NO LABEL STACK<br>1: MPLS LABEL PRESENT |
| 14 | L2_VTAG | 802.1Q VLAN TAG STATUS<br>0: NO VLAN TAG<br>1: VLAN TAG PRESENT |
| 13~11 | L2 PRIORITY | VALUE OF 802.1Q VLAN PRIORITY FROM TAG OR DEFAULT<br>PLEASE NOTE IF TOKEN RING, FDDI MAC IS IMPLEMENTED, THIS VALUE IS COPIED FROM THE MAC FRAME, IF A TAG IS NOT AVAILABLE. |
| 10~8 | L2_TYPE | LAYER 2 FRAME TYPE<br>000: ETHERNET VERSION 2<br>001: PPP<br>010: IEEE 802.3/802.2 SNAP<br>011: IEEE 802.3/802.2 SAP<br>100: RESERVED<br>101: NULL (RAW MPLS DATAGRAM) - INGRESS MUST SPECIFY THIS<br>110: NULL (RAW L3 DATAGRAM) - INGRESS MUST SPECIFY THIS<br>111: UNPROCESSED - ALL OTHER FIELDS ARE MEANINGLESS |
| 7~0 | InPortID | INGRESS PORT (CHANNEL) ID |

DATA PATH OPTIMIZATION ALGORITHM

BACKGROUND OF THE INVENTION

1. Field of the Invention

The invention relates to a method and apparatus for high performance switching in a network such as token ring, ATM, ethernet, fast ethernet, gigabit ethernet environments, LANs, WANs and other known networking protocols. In particular, the invention relates to a cell switching architecture employed in a network to provide fixed sized cell bursts when the removal of a header having a variable length occurs.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network.

A packet is a unit of data that is routed between a source and a destination network over the Internet or any other packet-switched network. When any file (i.e., e-mail message, HTML file, Graphics Interchange Format file, and an Uniform Resource Locator request) is sent from the source to the destination network via the Internet, the Transmission Control Protocol (TCP) layer of the TCP/IP may divide the file into "packets" of an efficient size for routing the data contained in the file. Each of these packets is separately numbered and includes the Internet address of the destination network. The individual packets for the given file may travel different routes through the Internet to reach the destination network. When all the packets have arrived at the destination network, the packets may be reassembled into the original file by the TCP layer at the receiving end of the destination network.

A packet, in general, loosely defines a block of variable-length data. Thus, packet-switching scheme may be an efficient way to handle transmissions on connectionless network such as the Internet. In comparison, a cell, in the network terminology, is a fixed-length of data as opposed to a variable-length of data. Cells are the basic unit of data transport used in protocols, such as ATM (Asynchronous Transfer Mode). One advantage of fixed-size cells is that the cells can be switched at a much higher speed than the variable-length sized packets. If all the data contained within the cells received is the same size, a network, which is controlling the flow of the data, can closely estimate the number of data cells that will be transmitted during a transmission interval. Conversely, if the network handles packets of data having variable length, the system cannot accurately predict when the data received into the network will finish exiting the output ports. However, when a network attempts to transmit voice and video data traffic, it is essential that the traffic flow is steady and predictable because this type of traffic is extremely time-sensitive and should avoid any unpredictable transmission delays.

Another concern is that, in a cell-based switch system, the burst size received at the input ports of a network typically determines the data path of the destination network. The burst size is a continuous transfer of data from the source network to the destination network without any interruptions. The size of the burst is often predetermined or programmed by the network designer. Therefore, some network designers may decide to limit the size of the burst of the data packet accordingly.

However, oftentimes, a need may arise for a source network to attach a header during a normal burst transfer to a destination network. If the data path structure of the destination network is programmed to accommodate a specific burst size, it may be difficult for the destination network to handle the extra header bytes. When the data is exchanged from some source networks, there is no assurance that the transmitted data employs the alignment configuration as required by the destination network. Thus, a misalignment predicament may occur and present a problem in the exchange of the data from the source to the destination network. Therefore, with some destination networks, some types of data must be aligned at the memory storage device (buffer memory).

For example, at the receiving side of the destination network, the system may be configured so that a destination network with a backplane interface which supports forty-eight channels to accommodate cells having sixty-four bytes burst. However, the transmitting side of the source network may need to attach a four-byte header to the beginning of the packet. When the cells of the packet arrives at the destination network, the destination network may extract the four-byte header from the cell, thus, leaving sixty bytes in the cell. This header removal step causes the cell to be four bytes short of the required format size since the cell now no longer satisfies the destination network's size requirement of sixty-four bytes. Thus, the cell containing only sixty bytes cannot be sent immediately to the buffer memory. The system must wait for the next cell of the packet for this particular channel to arrive. The system, then, extracts the first four bytes of the next incoming cell, and combines the newly extracted bytes with the sixty bytes of the previous cell. The network then sends the reconstructed cell to the buffer memory. Unfortunately, due to the misalignment of the cell after the removal of the header, the need to reconstruct the cells of the packet perpetuates throughout the transmission of all the subsequent cells of the packet. Namely, the process of extracting, waiting for the next incoming cell and then recombining the data has to be performed on all the remaining cells until the last cell of the packet arrives. One undesirable side effect of this data misalignment is that every channel may have to wait for four more bytes contained within the next incoming cell before the channel can write to the buffer memory. Such a stop-and-start writing process may cause the time interval of writing to the buffer memory to be bursty (some period of no writing and then many successive writes in a short period of time), which may adversely affect the buffer memory arbiter design.

SUMMARY OF THE INVENTION

One embodiment of the invention is drawn to a network device configured to prevent data misalignment of a data packet containing extra header bytes. The network device may include an ingress module having an input interface to receive a cell of the data packet. A header detector configured to detect a header of a cell of the data packet and remove the header from the cell of the data packet is also positioned on the network device. A counter determines whether the packet contains a multiple of a predetermined number of bytes. If the counter determines that the cell of the data packet does not satisfy the multiple of the predetermined number of bytes, an insertion module inserts the null bytes into the cell of the data packet to form a modified cell of the data packet after the header has been removed. Then, an extraction module removes the null bytes from the modified cell of the data packet as the cell of the data packet exits the network device.

In an alternate embodiment, the invention may provide a method of preventing data misalignment of a data packet containing extra header bytes. The method includes the steps of receiving a cell of the data packet at an input port of a network device. The methods further entails detecting a header of a cell of the data packet, removing the header from the cell of the data packet and determining whether the cell of the data packet contains a multiple of a predetermined number of bytes after the header has been removed. If the counter determines that the cell of the data packet does not satisfy the multiple of the predetermined number of bytes, the method may insert null bytes into the cell of the data packet to form a modified cell of the data packet. Then, the method forwards the modified cell of the data packet to an output port, and removes the null bytes from the modified cell of the data packet as the cell of the data packet exits the network device.

In another embodiment of the invention is a network device configured to prevent data misalignment of a data packet containing extra header bytes. The network device may include a receiving means for receiving a cell of the data packet at an input port of the network device. The network device further contains a detecting means for detecting a header of the cell of the data packet, a header removing means for removing the header from the cell of the data packet, and a determining means for determining whether the cell of the data packet contains a multiple of a predetermined number of bytes. The network device also contain an inserting means for inserting null bytes into the cell of the data packet to form a modified cell of the data packet, if the counter determines that the cell of the data packet does not satisfy the multiple of the predetermined number of bytes. Then, the network device may provide a forwarding means for forwarding the modified cell of the data packet to an output port, and a null byte removing means for removing the null bytes from the modified cell of the data packet as the modified cell of the data packet exits the network device.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The invention provides a system and a method for an aggregator 100 that is capable of eliminating data misalignment during data packet handling across a network device. As employed in the invention, the aggregator 100 may be a chip, a switch, a semiconductor device, a switch on a chip, a system on a chip or any other known data transmitting device. Initially, the description will provide a general overview of the system employing the invention. Then, the operation of the invention will be discussed, followed by a discussion of additional components that may interface with the aggregator 100.

Figure 1:
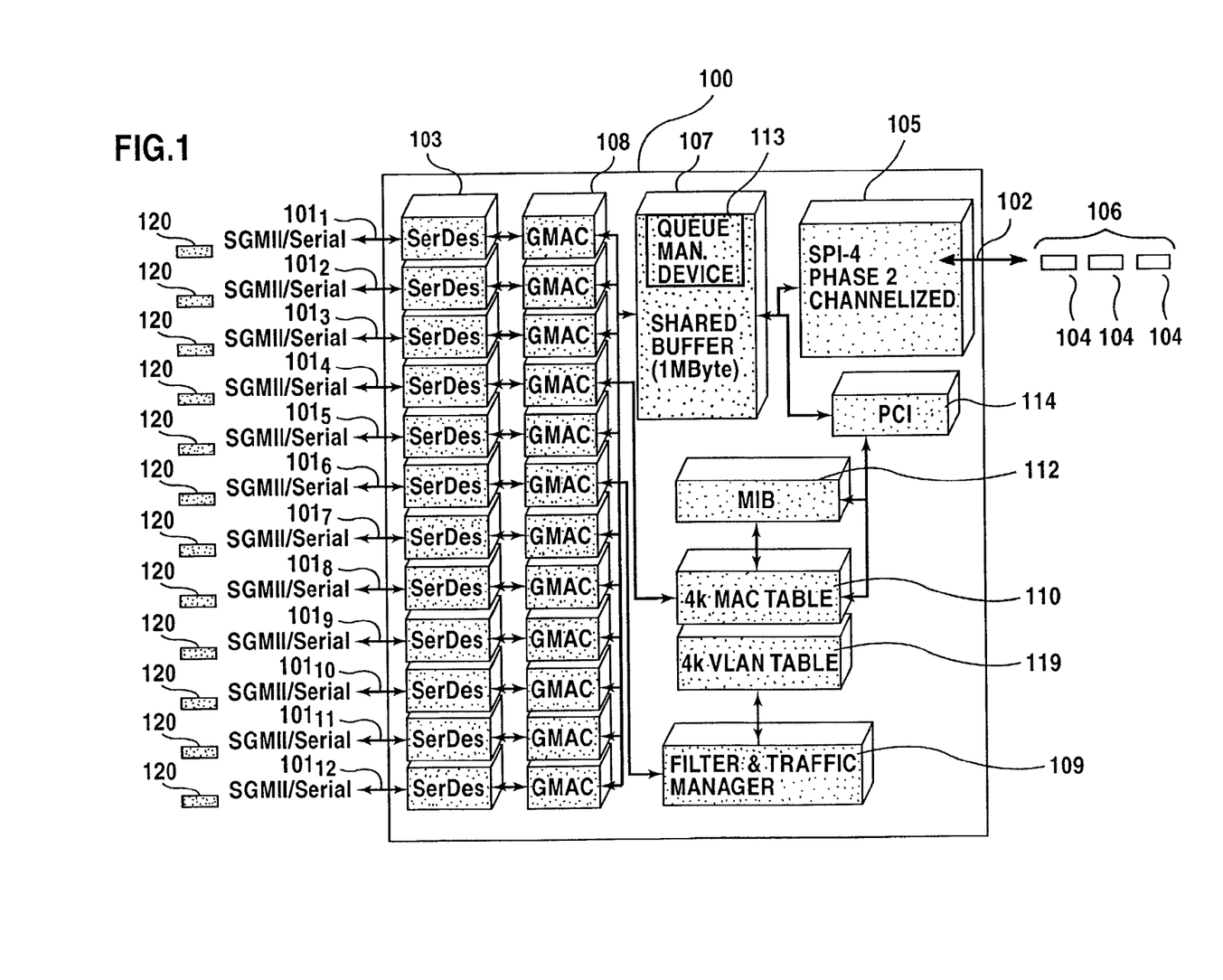
FIG. 1 is a general block diagram of exemplar elements of the invention.

FIG. 1 shows a general illustration of a network system which may employ the present invention. The aggregator 100 may be employed in applications such as aggregating multiple-Gigabit ports to an uplink interface backplane such as a System Packet Interface Level 4 (SPI-4) Phase 2 interface. However, other configurations are possible where the backplane may be an electronic circuit board containing circuitry and sockets into which additional electronic devices of other circuit boards or cards can be plugged.

The aggregator 100 of the present invention may be a Gigabit aggregator that supports twelve 1-Gigabit ports $101_{1-12}$ and one SPI-4 uplink 102 (having a Gigabit per second bandwidth) to connect to the backplane or any component of the physical layer (PHY) with all ports in wirespeed operation. The SPI-4 uplink may operate, for example, with a bandwidth up to 12 Gigabit per second. Although the discussion describes this embodiment of the invention as employing twelve 1-Gigabit interfaces $101_{1-12}$ and one SPI-4 uplink, this embodiment is merely an exemplar. Other configurations are possible. For instance, the invention may operate with more or less than twelve 1-Gigabit interfaces, and the invention may connect to other backplane devices.

The aggregator 100 may be configured as a twelve-port GE aggregator that collects traffic from the twelve 1-Gigabit ports $101_{1-12}$ and multiplexes them to the 12-Gigabit/s (SPI-4) uplink port 102. The aggregator 100 may support a static port/priority to channel mapping mechanism. Packets 120 that enter each 1-Gigabit port $101_{1-12}$ may consist of a variety of priorities. For example, the incoming the packets 120 may have up to eight different priority. Each priority can be mapped to, for example, one of the forty-eight SPI-4 channels. Alternatively, different priorities from different ports can all map to the same channel.

Figure 2:
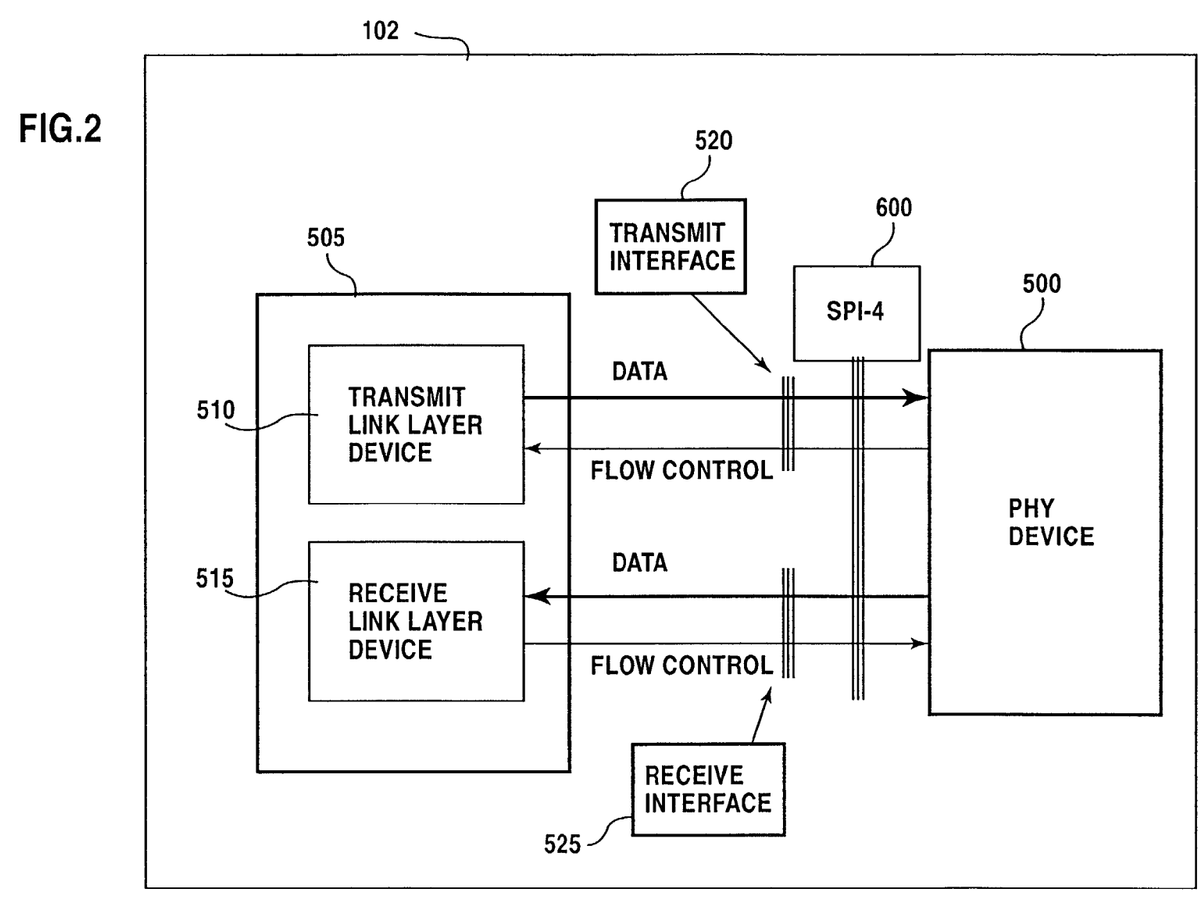
FIG. 2 is a block diagram of an exemplary uplink port, which may be employed in the invention.

For the uplink port 102 as shown in further detail in FIG. 2, the aggregator 100 may support a protocol such as the SPI-4 600 having a 10-12 Gigabit bandwidth. The SPI-4 may serve as an interface for transferring packets and/or cells between a physical layer (PHY) device 500 and a link layer device 505. In addition, the SPI-4 600 may be used in other applications such as aggregate bandwidths of OC-192 ATM and Packet over SONET/SDH (POS), as well as 10 Gb/s Ethernet. In general, the link layer is the protocol layer of the OSI model that handles the transfer of data in and out of a network across a physical link in the network. The link layer device 505 may ensure that an initial connection has been established between a source and a destination network. The link layer device 505 may include a transmit link layer device 510 having a transmit interface 520, and a receive link layer device 515 having a receive interface 525. The transmit link layer device 510 may control the transfer of the data flow and the associated control/status information from the link layer 505 to the PHY device 500. The transmit link layer device 510 may transmit the data packet or cell according to a predetermined format. As the data arrives at the link layer device 505, the receive link layer device 515 may control the reception of the data flow and associated control/status information from the PHY device 500 to the link layer 505. The receive link layer device 515 may handle the acknowledgments from a receiver that the data has arrived successfully. The link layer device 515 may also ensure that the incoming data has been received successfully by analyzing that the bit patterns are located at certain positions in the packet.

The transmit interface 520 and the receive interface 525 may be configured so that FIFO status information is out-of-band so that the FIFO status information is sent separately from the corresponding data path. By taking the FIFO status information out-of-band using different paths for the reception and transmission of the data, the invention may decouple the transmit interface 520 and the receive interface 525 so that each operates independently of the other. Such an arrangement may make Packet over Synchronous Optical Network (SONET), which is also referred to as Packet over SONET (POS), via the physical layer suitable not only for bi-directional but also for unidirectional link layer devices. SONET is the American National Standards Institute standard for synchronous data transmission over an optical media. SONET is considered to be the foundation for the physical layer of the broadband ISDN (Integrated Services Digital Network). The international equivalent of SONET is the synchronous digital hierarchy (SDH). Together, these standards ensure that digital networks can interconnect internationally and that existing conventional transmission systems can take advantage of optical media through tributary attachments. The SONET includes a set of signal rate multiples for transmitting digital signals on optical fiber. The base rate of the optical carrier levels is (OC-1), which has a data rate of 51.84 Mbps. The OC-192 is a multiple of the base rate, and has a data rate of 10 Gbps (Gigabits per second). According to an embodiment of the invention, the SPI-4 may serve as an interface for transferring packets and/or cells between the physical layer device 500 and the link layer device 505, and for aggregate bandwidths of data transferring protocols, such as the OC-192 ATM and Packet over Synchronous Optical Network (SONET)/synchronous digital hierarchy (SDH) (POS), as well as 10 Gigabit/sec Ethernet.

Referring to FIG. 1, as the cells 104 of the packet 106 enter the aggregator 100 via the uplink port 102, the cells 104 may arrive at a SPI-4 Phase 2 channelized device 105. The SPI-4 Phase 2 channelized device 105 may be configured to include a plurality of channels (not shown) each having a respective assembly line designated to receive all of the cells for a particular data packet. For example, the SPI-4 Phase 2 channelized device 105 may be configured to include forty-eight channels (not shown) having forty-eight respective assembly lines. The cells 104 of the data packets 106 may be transmitted to the aggregator 100 from the SPI-4 in sequential order.

In FIG. 1, at the twelve 1-Gigabit ports $101_{1-12}$, the aggregator 100 may support Serial Gigabit Media Independent Interface (SGMII) interfaces with full-duplex operation at Gigabit speed, and full- or half-duplex operation at 10/100 Mbps speed. The full-duplex operation enables the aggregator 100 to transmit data in both directions over a physical medium simultaneously. The half-duplex operation allows the aggregator 100 to transmit data in only one direction over a physical medium. The SGMII interfaces may be designed to convey network data and port speed between a 10/100/1000 PHY and a GMAC (gigabit medium access control) 108. The SGMII is a serial version of the GMII (Gigabit Media Independent Interface) protocol, and the SGMII may use only two data signals and two clock signals to convey packet data and link rate information between the 10/100/1000 PHY and the GMAC 108. The SGMII may attach to the Reconciliation Sublayer and Physical Coding Sublayer (PCS) Layers of the invention, allowing multiple media types to be connected to the 1000 Mb/s GMAC sublayer.

At the twelve 1-Gigabit interfaces $101_{1-12}$, the physical medium attachment (PMA) sublayer may perform symbol serialization and deserialization (SERDES). Since the physical layer is a means of transmitting a serial bit stream, instead of packets or cells, between two components of the network, the encoded stream of bit systems may be serialized before transmission, and the received bit stream may be deserialized and passed as bit symbols to the physical coding sublayer (PCS).

The SerDes 103 may be responsible for reassembling any binary streams received from the SGMII interface back into byte-oriented data. Namely, the GMAC 108 may be responsible for passing byte-oriented data passed to the GMAC 108 from the shared buffer memory 107 to the SerDes 103 for serializing the data into a bit stream that can be transmitted over the SGMII interface. The aggregator 100 may include bridges (not shown) at the GMAC 108 sublayer to aid in forwarding the packet 120 received on one port of the aggregator 100 to another port.

The GMAC 108 sublayer may also define the medium independent capability for the packet transmission and reception using CSMA/CD (carrier sense multiple access/collision detection) access method. The GMAC 108 may employ the CSMA/CD to detect any collisions that may occur during the transmission of the data contained in the packet 120 from the network. If a collision is detected, the GMAC 108 may back off for a period of time prior to the retransmission of the data.

A filtering process, which may be performed by the filter and traffic manager 109, may be responsible for comparing the destination and source address of the received data packet 120 with the address previously stored in the MAC Table 110 and the Virtual LAN (VLAN) table 111. The aggregator 100 may be configured so that all entries inputted into the MAC table 110 and the VLAN table 111 are programmed by the CPU (not shown). Alternatively, the MAC table 110 and VLAN table 111 may be configured so that they are learning tables. In the aggregator 100, as the packet 120 are received at the gigabit ports $101_{1-12}$, filtering and forwarding of the packet 120 to destination port (SPI-4 module 105) may be performed for each packet 120.

For each 1-Gigabit port $101_{1-12}$, there is a receiving (Rx) FIFO (not shown) to interface with the GMAC 108. The maximum packet size supported in the Rx FIFO may be, for example, 9600 B (Jumbo Packets). To determine the destination of the packet 120, the address comparison may be performed as soon as possible during the reception of the packet 120. The pertinent information needed to determine the destination of the packet may be retrieved and put into a parser register (not shown) while the packet 120 is being transferred to the Rx FIFO (not shown). The parser register may be a Rx FIFO shift register. The GMAC 108 may parse the pertinent information while the packet 120 is being transferred to the Rx FIFO by monitoring the Rx FIFO address and the data bus, which is the wire or a group of wires used to transmit the data from one port in the system to another port. The GMAC 108 may then parse from packet 120 all the L2/L3/L4 fields (such as the L2 destination address (DA)/source address (SA), VLAN ID, L3 DA/SA) and store the pertinent information into the register (not shown).

When the packet 120 is received into the aggregator 100 and before passing the packet 120 up to the next layer, the GMAC 108 may perform a cyclical redundancy check (CRC) on the validity of the content of the newly received packet. If the CRC fails, the aggregator 100 may drop the particular packet. If the CRC check passes, the GMAC 108 may forward the extracted information from the packet 120 to the parser registers to an L2/L4 engine (not shown) to perform an L2 and L4 search. The L2 and L4 search may create a key to match against the entries stored in the register in order to perform the layer 2 and layer 4 forwarding decisions. For example, the L2 search engine may search the MAC DA to determine whether to filter the packet 120 or send the packet 120 to the SPI-4 600 or to the CPU (not shown). The aggregator 100 may be configured so that all entries inputted into the MAC table and VLAN tables are programmed by the CPU (not shown). In such a case, the aggregator 100 may be configured so that there is no learning performed by the L2 search module and no aging performed on the tables.

Alternatively, the aggregator 100 may be designed so that a learning process does occur on the L2 search module and so that an aging check occurs to flush from the tables any entries where there has been no activity from that address for a specific time. In general, layer two switching-related devices are typically referred to as multiport bridges, and are capable of bridging two separate networks. Bridges can build a table of forwarding rules based upon which MAC (media access controller) addresses exist on which ports of the bridge in order to pass the packet 120 which are destined for an address which is located on an opposite side of the bridge. Layer 2 based learning is the process of constantly updating the MAC address portion of the forwarding database based on the traffic that passes through the aggregator 100. When a packet 120 enters the aggregator 100, an entry may be created (or an existing entry may be updated) in the database that correlates the MAC source address (SA) of the packet 120 with the input port upon which the packet arrived. In this manner, the aggregator 100 "learns" on which subnet a node resides.

The L2 search may be performed for both the 1-Gigabit ports $101_{1\text{-}12}$ and the SPI-4 uplink port 102. The aggregator 100 may support L2 address table entries, each specifying a MAC address, a VLAN tag, and a destination port. The L2 search may be performed by the aggregator 100 to generate an access list by filtering based on the MAC address and the VLAN tag. The searching tables of the MAC Table 110 and the VLAN Table 111 may be shared among all ports in a round-robin fashion in order to determine the route needed to pass a packet to a destination network. A round robin method is an arrangement of searching the tables equally in some rational order, usually from the top to the bottom of a list and then starting again at the top of the list and so on. Namely, round robin involves "taking turns" searching the tables.

The invention may also support internal MAC addresses, which is the address that is unique to each computer's hardware number. The invention may support internal MAC addresses for the twelve 1-Gigabit ports $101_{1\text{-}12}$ and internal IP multicast MAC addresses for the SPI-4 uplink port 102. Multicast MAC addresses can be stored and searched within the aggregator 100. The aggregator 100 may support both port-based and tagged (802.1q and 802.3ac) Virtual LAN (VLAN) for the 1-Gigabit ports $101_{1\text{-}12}$ and the SPI-4 uplink port 102. The aggregator may also support VLAN addresses with the 802.1s Multiple Spanning Tree option, and flexible and programmable ingress and egress checking rules for VLAN processing. The VLAN feature may allow the network operators to configure and administer a corporate network as one single bridge-interconnected entity, while providing the users the connectivity and privacy that they may expect from having multiple separate networks. The spanning tree algorithm may define the protocol for preventing data loops, which is a situation wherein a packet endlessly loops in a network looking for a particular address.

For the L2 search for the SPI-4 uplink port 102, the aggregator 100 may be configured so that the packets received from the SPI-4 uplink port 102 may be only L2 searched if the packet is a multicast packet. If the data packet is an unicast packet, the aggregator 100 may be configured so that the cells 104 of packet 106 is forwarded from the SPI-4 interface 600 to an appropriate 1-Gigabit port based on the channel identification. Thus, the aggregator 100 may support a separate L2 MAC address table for the SPI-4 uplink port 102 with 1K entries representing 1K IP multicast groups. As mentioned above, each entry may specify a MAC address, a VLAN tag, and a destination port map, and searching on the tables may be hash-based, with both the MAC address and the VLAN tag as input to the hashing circuitry.

The aggregator 100 may also be configured to support several MIB (Management Information Base) counters 112 for network management. The MIB 112 may specify the different counters, status events, alarms, and notification for each managed device. For instance, the MIB counters 112 may support the Ethernet, history, alarm, host, matrix and event groups. The MIB counters 112 may be incremented by the request of a port manager, L2 search engine, and a buffer management engine.

The cells 104 of the packet 106 entering the aggregator 100 via the SPI-4 uplink port 102 may be sent to a shared buffer 107 for storage and forwarding. In the preferred embodiment, the data stored in the shared buffer 107 may be stored as packets only. Alternatively, the data may be stored in the shared buffer 107 as cells. The shared buffer 107 may be a data storage area shared by the components of the aggregator 100 or program processes that operate at different speeds or with different sets of priorities to temporarily hold the data until it can be processed. The width of the shared buffer 107 may be large enough to provide sufficient bandwidth to achieve wirespeed switching between the SPI-4 uplink 102 and the twelve 1-Gigabit ports $101_{1\text{-}12}$. Thus, the buffer manager 107 may operate in one of two modes: sharing and non-sharing. When the total number of used memory units is small, the buffer manager 107 may be set in the sharing mode. When the total number of used memory units is large, the buffer manager 107 may be set in the non-sharing mode. The boundary of the two modes depends on whether the aggregator 100 is configured to accept jumbo packets. The shared buffer 107 may be divided into two halves, with the twelve 1-Gigabit ports $101_{1\text{-}12}$ sharing one half and the SPI-4 port 102 and the CPU port 150 sharing the other half. The size of the shared buffer 107 may be 1-MB with half of the buffer being shared among the twelve 1-Gigabit ports $101_{1\text{-}12}$, and the other half shared between a CPU port and SPI-4 uplink port 102.

A queue management device 113 of the shared buffer 107 may handle the queue management, and may be responsible for assigning pointers to incoming packets 106 and packets 120, as well as assigning common packet IDs (CPID) once cells 104 of the packet 106 is fully written into the shared buffer 107. The components of the shared buffer 107 can also handle management of the on-the-aggregator free address pointer pool, control actual data transfers to and from the data pool, and provide memory budget management.

The aggregator 100 may be initialized and configured by EEPROM(s) (electrically erasable programmable read-only memory) or a CPU (not shown). If the aggregator 100 operates without an EEPROM, the aggregator 100 may require the CPU (not shown) connected by a peripheral component interconnect (PCI) 114 to initialize the aggregator 100, handle the routing protocols, route the cells of the packets received by the aggregator 100, maintain the aggregator 100 search tables, and support the network management functions. The PCI interface may allow a significant degree of freedom in the selection of a CPU and may enable multiple aggregators to share one CPU. The CPU may be established as a separate port having a Tx FIFO and Rx FIFO connected to the aggregator 100.

In addition, the CPU interface may support two types of data transfer mechanism between the CPU and the aggregator: Direct Memory Access (DMA) and Table Access. The CPU may initiate a DMA transfer by instructing the aggregator 100, the base memory address and the length of the data packet transfer. The CPU may initiate a table access by sending a command to the aggregator 100 that specifies the particular search table and information that the CPU wishes to access. The CPU may send or receive Ethernet cells or packets to and from the aggregator 100 using the DMA. The CPU may also use table access or the DMA to access the search tables located on the aggregator 100. The aggregator 100 may be configured to include at least two L2 address tables, two VLAN tables, twelve L4 tables, a network management information base (MIB) table, an external EEPROM table, and a table consisting of all the external PHY registers.

For the invention to support an acceptable standard of Quality of Service (QoS), each output port may have various priority queues. For example, the invention may employ eight priority queues and their assignment can be based on differential services type of service field or the priority field. QoS, in networking terminology, is the idea that the data transmission rates, error rates, and other characteristics can be measured, improved, and, to some extent, guaranteed in advance. The invention may permit a company or a user to specify in advance a level of quality in terms of service. Thus, the QoS may be measured and guaranteed in terms of the average delay at a gateway, the variation in the delay in a group of cells, cell losses, and the transmission error rate. Each output port may retrieve the packets from the shared buffer 107 based on the priority queuing and send the packets to a transmitting (Tx) FIFO (not shown).

Other features of the aggregator 100 may include packet trapping and forwarding to the CPU (not shown), various loopback options for the SPI-4 interface 102 and the SGMII interfaces $101_{1-12}$, and a power down mode for the analog portion of the SGMII interface when the port is not connected.

An example of a functional description of the aggregator 100 will now be provided.

As the cells 104 of the packet 106 enter the aggregator 100 from the SPI-4 interface 600 via the uplink port 102, the cells 104 of the data packet 106 arrive at a SPI-4 Phase 2 channelized device 105. The SPI-4 Phase 2 channelized device 105 may be configured to include a plurality of channels each having a respective assembly line designated to receive all of the cells 104 for a particular data packet 106. For example, the SPI-4 Phase 2 channelized device 105 may be configured to include forty-eight channels having forty-eight assembly lines. As the cells 104 of the data packets 106 are transmitted to the aggregator 100 via the uplink port 102, the cells 104 may arrive in sequential order.

As the cells 104 of the packets 106 arrive at the uplink port 102, the packet 106 may be defined per the standards established for the SPI-4 protocol and may have any length or structure as defined by the SPI-4 standard. This discussion will assume that the length of the data packet 106 is programmed to be one hundred-twenty bytes plus an additional eight-byte header attached by the SPI-4. Thus, the total length of the data packet 106 equals one hundred twenty-eight bytes in this example.

In this example, the aggregator 100 may be configured as a cell-based aggregator 100, wherein the data path structure of the aggregator 100 is optimized to accommodate, for example, a sixty-four-burst size. As discussed above, the burst size received at the input ports of a network typically determines the data path structure. When the data packet 106 is received by the SPI-4 Phase 2 channelized device 105, an ingress sub-module (not shown) may remove the eight-byte header from the cell 104 containing the header (the header cell), leaving only fifty-six bytes remaining in the header cell of the packet 106. The aggregator 100 may remove the header of the packet so that the data of the packet may be processed. Then, the ingress sub-module of the SPI-4 channelized device 105 may check to determine whether the cell 104 which included the header now contains a multiple of a predetermined number of bytes, for example, a multiple of the sixty-four-burst size. Now, after the removal of the header, the remaining incoming cells 104 may be misalignment if the bytes contained in the header cell no longer satisfy a multiple of the predetermined number, as required by the aggregator's data structure. To prevent such data misalignment from occurring, the ingress sub-module of the SPI-4 channelized device 105 may insert eight null-bytes into the header cell to replace the eight-byte header, which were removed. As a result of this null-byte insertion technique, this modified header cell will cause the remaining incoming cells to be aligned to the burst size mandated by the aggregator 100.

The ingress sub-module of the channelized device 105 may also tag a two-bit of status information to the modified header cell to indicate the number of null-bytes inserted into the cell.

Also as an ingress function, the ingress submodule of the channelized device 105 may determine the destination of the packet 106. The cells 104 of the data packet 106 may be buffered by the ingress sub-module and compared to data stored in the Layer 2 MAC address lookup table 110 and the VLAN ID lookup table 111 to determine the destination port on the 1-Gigabit ports $101_{1-12}$.

As previously discussed, when the cells 104 of the data packets 106 are transmitted to the aggregator 100 via the uplink port 102, the cells 104 may arrive in sequential order so that the cells 104 may be stored in the shared buffer 107 sequentially. Namely, the cells 104 of the packet 106 may be reassembled sequentially in the assembly lines of the SPI-4 channelized device 105. Then, the aggregator 100 may send the cells 104 to the shared buffer 107 so that the cells 104 are stored and positioned in the shared buffer 107 sequentially to resemble an assembled packet. When the shared buffer 107 receives a read request from the GMAC 108, the shared buffer 107 merely transfers the requested cells 104 of the packet 106 out of the network. Accordingly, when the shared buffer 107 receives a read signal, there is no need for the shared buffer 107 to rearrange and reassemble the cells of the packets sequentially.

To transfer the cells 104 of the packet 106 from the aggregator 100, the shared buffer 107 may monitor the read requests from the GMAC 108 and continuously look for a read request associated with the cells of a packet 106 stored in the shared buffer 107. If a matching read request is received, the egress submodule may retrieve the cells associated with the packet out of the shared buffer 107, and place the cells 104 on the appropriate output port of the 1-Gigabit ports $101_{1-12}$.

Since the cells 104 of the packets 106 may have been assembled in the shared buffer 107 sequentially, the aggregator 100 may not need to reassemble the cells 104 of the packet 106 before the packet is transmitted out of the aggregator 100. As the cells 104 of the packet 106 exit the aggregator 100, another function of the egress sub-module is to determine if any cells of the packet 106 contain null bytes by checking the cells to determine if any header cell was tagged with status information indicating that null bytes were inserted into the cell by the ingress sub-module of the SPI-4 channelized device 105. If a header cell 104 of the packet 106 does contain null bytes, the egress module may read the status information and extract the null bytes from the header cell containing the null bytes. Namely, as the header cell 104 of the packet 106 exits the aggregator 100, the egress sub-module may strip the null bytes from the header cell and transfer the header cell and the remaining cells 104 of the packet 106 out of the aggregator 100 via one of the 1-Gigabit ports $101_{1-12}$.

Figure 3A:
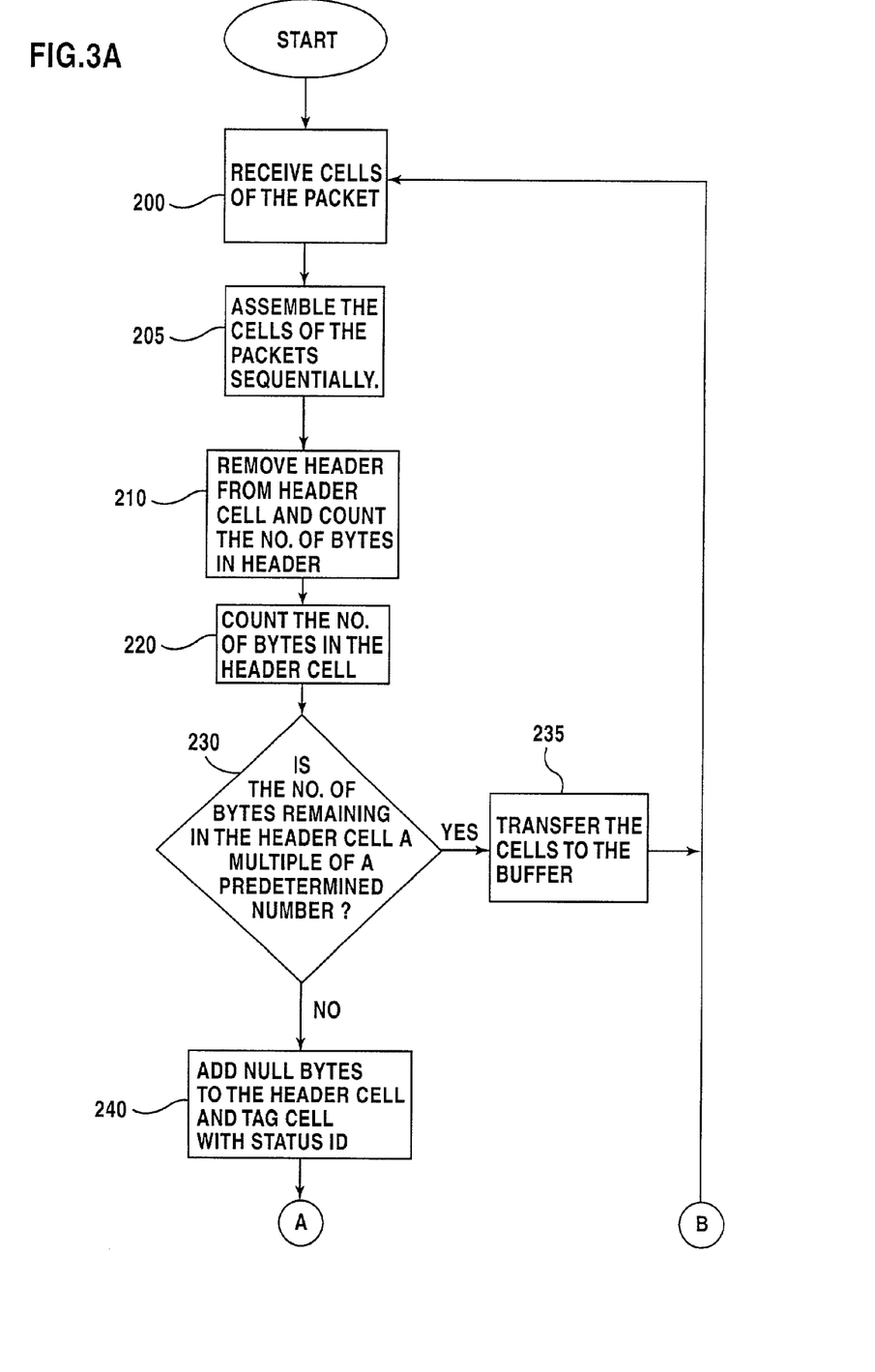
FIGS. 3A-3C are exemplars of flow diagrams of the data packet handling process.
Figure 3B:
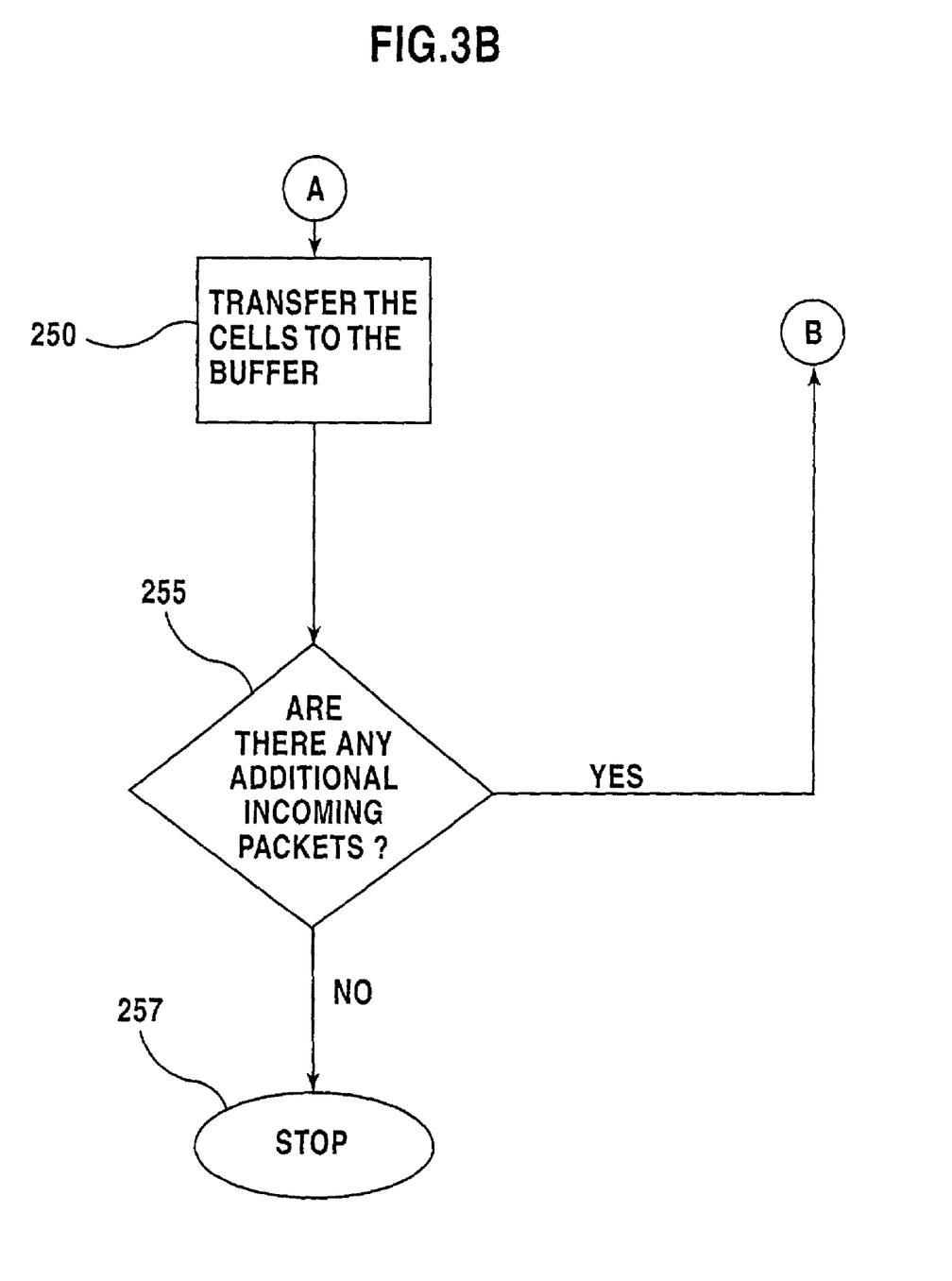

FIGS. 3A and 3B generally illustrate an example of a flow diagram of the handling of the cells 104 of a packet 106 when the cells 104 are received at an appropriate assembly line of the SPI-4 channelized device 105. In step 200, the SPI-4 port 102 may receive the packets from the source network. The cells may be arranged in sequential order at step 205. The ingress sub-module of the SPI-4 channelized device 105 may remove the header from the header cell and count the number of bytes in the extracted header in step 210. Then, in step 220, the ingress sub-module may count the bytes remaining in the header cell. In step 230, the ingress sub-module may check to determine whether the number of bytes remaining in the header cell is a multiple of a pre-determined number. If so, at step 235, the ingress module may transfer the cell to the buffer and return to step 200. If not, the process may advance to step 240 and may add null bytes to the header cell to replace the number of bytes contained in the extracted header. At step 240, the ingress module may also tag the cell with status information which indicates the number of null bytes inserted into the header cell. In step 250, the cells may then be transferred to the buffer memory. In step 255, the process may check to see if there are additional incoming cells. If so, the process returns to step 200. If not, the ingress functions of the process may terminate in step 257.

Figure 3C:
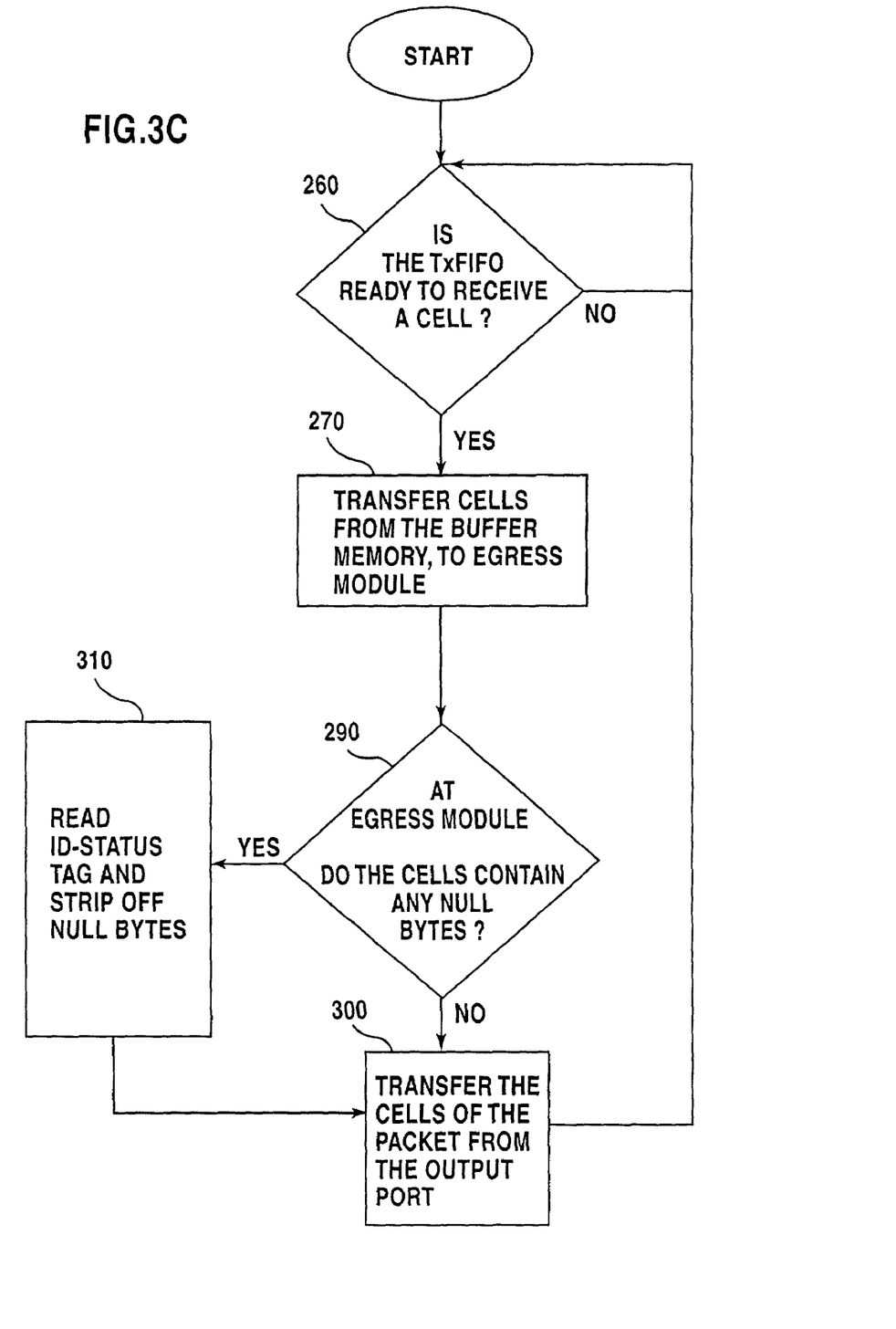

FIG. 3C generally illustrates an example of a flow diagram of the handling of the cells 104 of the packet 106 when the cells 104 are being transmitted from the aggregator 100. At the egress module (not shown) of the 1-Gigabit ports at step 260, the process may check to determine whether the TxFIFO has issued a read request, which indicates that the TxFIFO is ready to receive the cells of a packet stored in the memory. If no, the process returns to step 260. If yes at step 260, the process may retrieve the cells associated with the requested packet and transfer the cells that make up the packet to the egress module at step 270. The egress module, in step 290, may check to determine whether any cells of the packet contain null bytes. If not, the process may proceed to step 300 and transfer the cells of the packet from the output port. If so, in step 290, the process may determine the number of nulls by reading the status information tag at step 310. The egress module may also remove the null bytes from the packet in step 310. Then, the egress module may transfer the packet out of the output port in step 300.

Figure 4A:
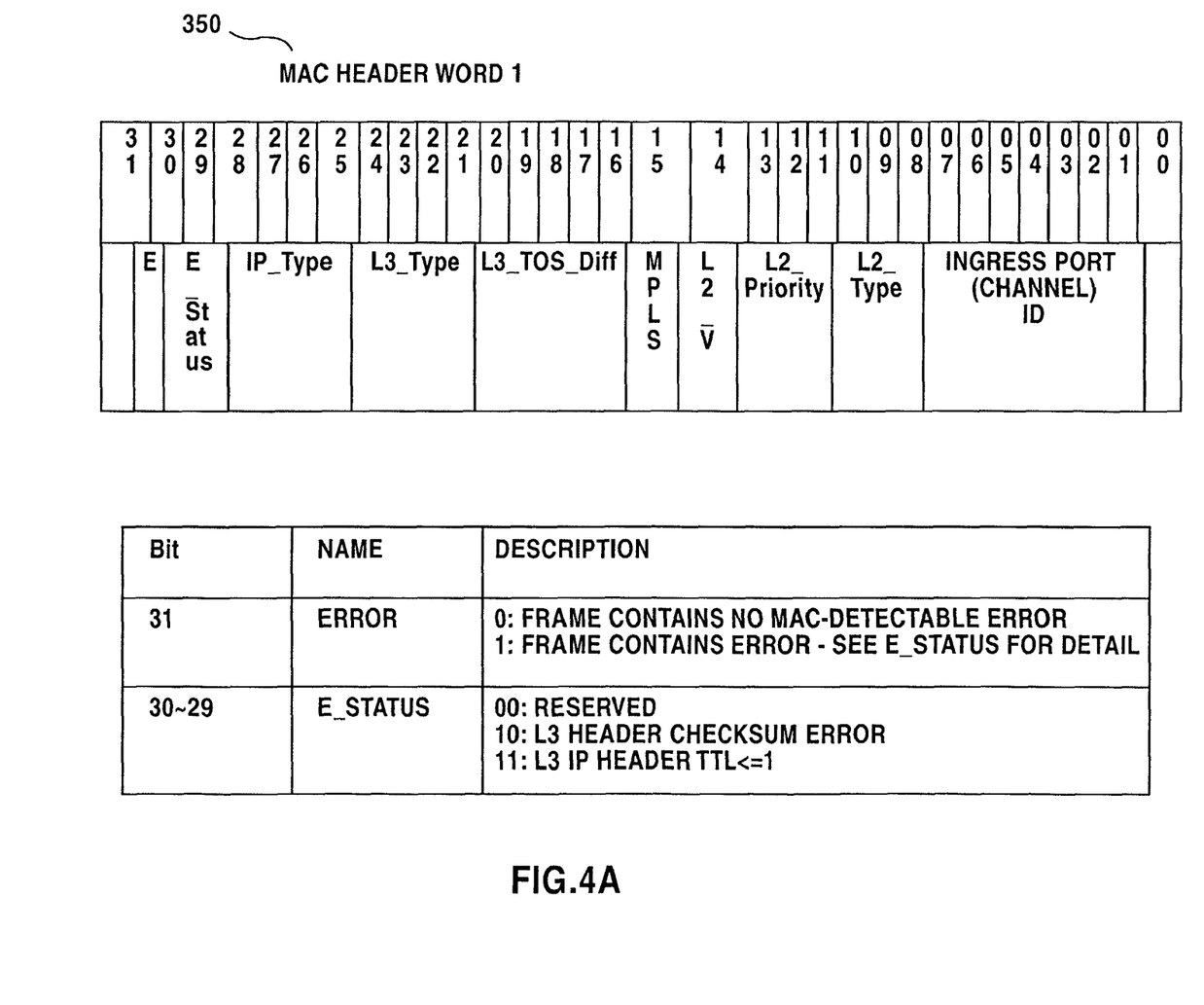
FIGS. 4A-4B depict an exemplary header format, which may be employed in the invention.
Figure 4B:
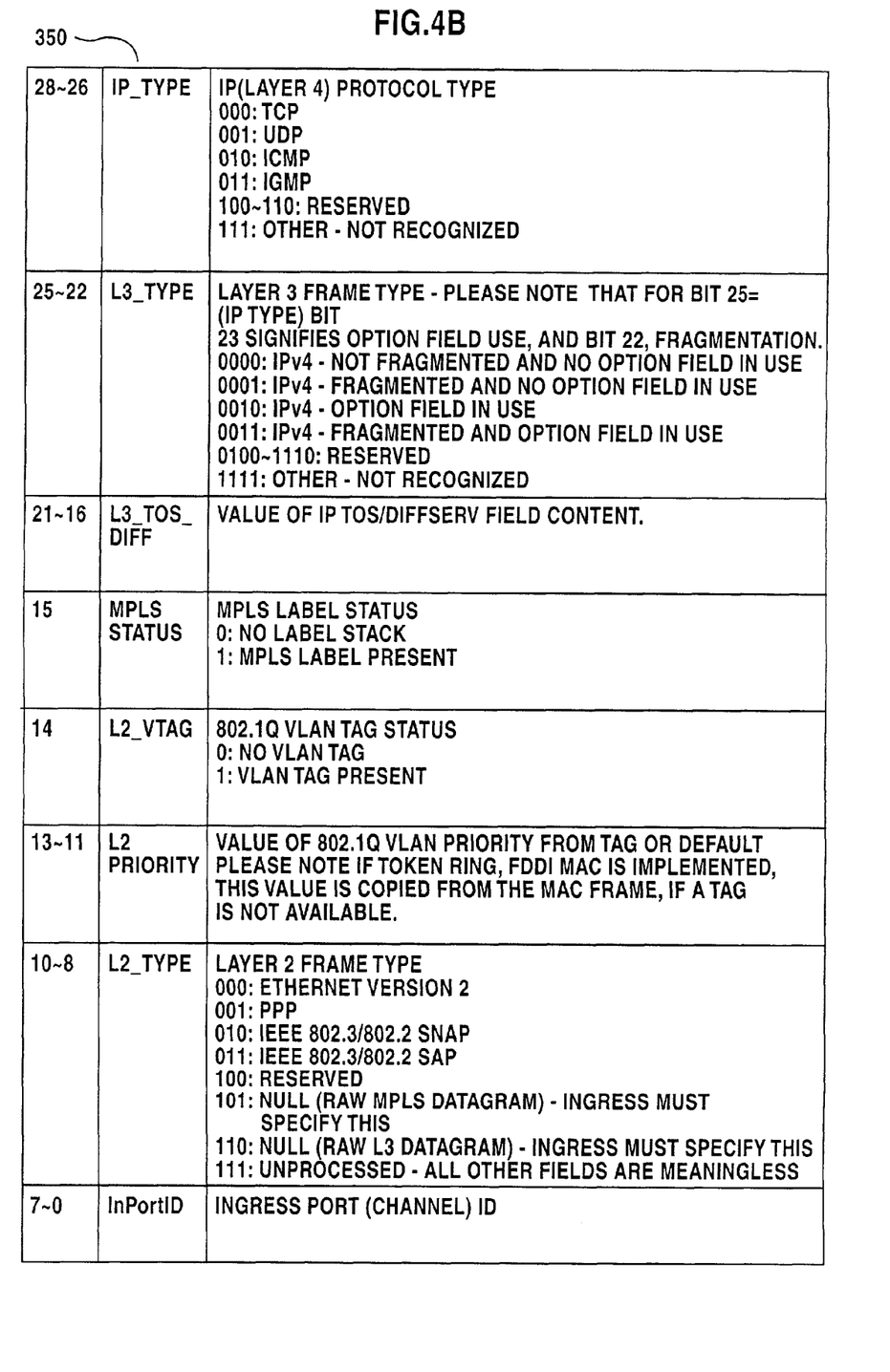

FIGS. 4A and 4B may depict an exemplary header format 350 that may be employed in the invention. The exemplary header 350 may be an eight-byte header (two thirty-two-bit words), which may be appended at the beginning of the packet 104 before the cells of the packet are sent to the SPI-4 uplink port 102 from outside of the aggregator 100. As discussed above, in many of the high-speed networking application, the packets may need to be dispatched to the proper processing unit of a destination network based on the packet's classification, such as a video or a voice data packet. Thus, it may be desirable, if not a requirement, for a source MAC to attach a header that contains preliminary parsed information that indicates that the packet has already been processed. In addition, the header may be used by its customer to encode user specific information.

A further description of additional interface components of the aggregator 100 will now be provided.

The aggregator 100 may also include a per-port auto-negotiation enable bit, which, in general, allows two devices at either end of a 10 Mb/s, 100 Mb/s or 1000 Mb/s link to advertise and negotiate enhanced modes of operation such as the speed of the link whether or not the link is to run at a half or full duplex configuration. Namely, the auto-negotiation may determine the capabilities of the remote-link partner device and determines the optimal common mode of operation shared by the two devices. Control information may be transferred from the PHY (physical layer) to the MAC to signal the change of the link status. This may be achieved by using the Auto-Negotiation functionality defined in Clause 37 of the IEEE Specification 802.3z.

The aggregator 100 may be configured to provide bandwidth control through policing and shaping on the 1-Gigabit ports $101_{1-12}$. Ingress policing may be implemented with, for example, 1 Mbps granularity per flow on GE ports, and egress shaping may be implemented with, for example, 1 Mbps granularity on a per port basis. Both features may be implemented using a dual leaky bucket mechanism so that traffic from each of the 1-Gigabit ports $101_{1-12}$ can be classified into multiple flows.

In summary, the invention may provide a data path optimization algorithm that may resolves byte misalignment problem caused by header attachment in a data transmission network, such as an aggregator. To mitigate the occurrence of data misalignment, the invention may write null bytes to replace the empty spaces created by the header extraction. Thus, the data burst written to the buffer memory may still be aligned to satisfy the network's data structure. At the egress port of the network, the null bytes can be removed as the cells of the packet exit the system.

An additional benefit derived by the invention is that the invention may work well with headers of various byte sizes. Thus, the invention does not restrict the aggregator 100 to be compatible with only one fixed-size system. In addition, the aggregator 100 may not waste any extra bandwidth, typically wasted when conventional devices interfaces with other networks.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

I claim:

1. A network device configured to prevent data misalignment of a data packet containing extra header bytes, the network device comprising:
   at least one computer processor configured to execute instructions stored using at least one computer memory, the network device including:
   an ingress module having an input interface to receive a data packet comprising a plurality of cells, wherein a header cell of the data packet is one of the plurality of cells of the data packet, wherein the header cell of the plurality of cells comprises a header and packet data information and wherein the header cell includes the header in its entirety for the data packet;
   a header detector configured to detect the header cell of the data packet and remove the header from the header cell of the data packet;

a counter configured to determine whether the header cell of the data packet contains a multiple of a predetermined number of bytes after the header has been removed from the header cell;

an insertion module configured to insert null bytes into the header cell of the data packet to form a modified header cell of the data packet if the counter determines that the header cell of the data packet does not satisfy the multiple of the predetermined number of bytes in order to align all of a plurality of other cells of the packet; and an extraction module configured to remove the null bytes from the modified header cell of the data packet as a modified cell of the data packet exits the network device.

2. The network device as recited in claim 1 wherein the network device comprises an aggregator that interfaces with an Ethernet and a System Packet Interface Level 4 communication system.

3. The network device as recited in claim 2 wherein the aggregator is configured to interface between a twelve 1-Gigabit ports and one 12 Gigabit/s System Packet Interface Level 4 uplink.

4. The network device as recited in claim 2 comprises a network switch.

5. The network device as recited in claim 1 further comprising:

a medium access control (MAC) protocol module having a MAC address for transmitting the modified cell of the data packet; and a layer two switching module configured to build a table of forwarding rules upon which the MAC addresses exist and to instruct the extraction module to remove the null bytes from the modified cell of the data packet as the modified cell of the data packet exits the network device.

6. A method of preventing data misalignment of a data packet containing extra header bytes, said method comprising:

receiving, at an input port of a network device, a data packet comprising a plurality of cells, wherein a header cell of the data packet is one of the plurality of cells, wherein the header cell of the plurality of cells comprises a header and packet data information and wherein the header cell includes the header in its entirety for the data packet;

detecting the header cell of the data packet;

removing the header from the header cell of the data packet;

determining whether the header cell of the data packet contains a multiple of a predetermined number of bytes after the header has been removed from the header cell;

inserting null bytes into the header cell of the data packet to form a modified header cell of the data packet if the counter determines that the header cell of the data packet does not satisfy the multiple of the predetermined number of bytes in order to align all of a plurality other cells of the packet;

forwarding the modified header cell of the data packet to an output port; and removing the null bytes from the header cell of the data packet as a modified cell of the data packet exits the network device.

7. The method as recited in claim 6, further comprising the step:

interfacing with an Ethernet and a System Packet Interface Level 4 communication system.

8. The method as recited in claim 7 wherein the interfacing occurs between a twelve 1-Gigabit ports and one 12-Gigabit/s System Packet Interface Level 4 uplink.

9. The method as recited in claim 6 further comprising the steps of:

providing a medium access control (MAC) protocol module having a MAC address for transmitting the modified cell of the data packet; and providing a layer two switching module configured to build a table of forwarding rules upon which the MAC addresses exist and to instruct the extraction module to remove the null bytes from the modified cell of the data packet as the modified cell of the data packet exits the network device.

10. A network device configured to prevent data misalignment of a data packet containing extra header bytes, the network device comprising:

receiving means for receiving, at an input port of the network device, a data packet comprising a plurality of cells, wherein a header cell of the data packet is one of the plurality of cells of the data packet, wherein the header cell of the plurality of cells comprises a header and packet data information, and wherein the header cell includes the header in its entirety for the data packet;

detecting means for detecting the header cell of the data packet;

header removing means for removing the header from the header cell of the data packet;

determining means for determining whether the header cell of the data packet contains a multiple of a predetermined number of bytes after the header has been removed from the header cell;

inserting means for inserting null bytes into the header cell of the packet to form a modified header cell of the data packet if the counter determines that the header cell of the data packet does not satisfy the multiple of the predetermined number of bytes in order to align all of a plurality of other cells of the packet;

forwarding means for forwarding the modified header cell of the data packet to an output port; and null byte removing means for removing the null bytes from the modified header cell of the data packet as a modified cell of the data packet exits the network device.

11. The network device as recited in claim 10, further comprising the step:

interfacing with an Ethernet and a System Packet Interface Level 4 communication system.

12. The network device as recited in claim 11 wherein the interfacing occurs between a twelve 1-Gigabit ports and one 12-Gigabit's System Packet Interface Level 4 uplink.

13. The network device as recited in claim 10 further comprising:

module providing means for providing a medium access control (MAC) protocol module having a MAC address for transmitting the modified cell of the data packet; and table providing means for providing a layer two switching module configured to build a table of forwarding rules upon which the MAC addresses exist and to instruct the extraction module to remove the null bytes from the modified cell of the data packet as the modified cell of the data packet exits the network device.

* * * * *

UNITED STATES PATENT AND TRADEMARK OFFICE
CERTIFICATE OF CORRECTION

| | | |
|---|---|---|
| PATENT NO. | : 8,325,716 B2 | Page 1 of 1 |
| APPLICATION NO. | : 09/982794 | |
| DATED | : December 4, 2012 | |
| INVENTOR(S) | : Shih-Hsiung Ni | |

It is certified that error appears in the above-identified patent and that said Letters Patent is hereby corrected as shown below:

In column 14, line 50, In Claim 12, delete "12-Gigabit's" and insert -- 12-Gigabit/s --, therefor.

Signed and Sealed this
Twenty-sixth Day of February, 2013

Teresa Stanek Rea
*Acting Director of the United States Patent and Trademark Office*